(12) United States Patent
Pelissier (10) Patent No.: US 6,850,513 B1
(45) Date of Patent: Feb. 1, 2005

(54) TABLE-BASED PACKET CLASSIFICATION (75) Inventor: Joseph E. Pelissier, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,455

(22) Filed: Dec. 30, 1999

(51) Int. Cl.$^7$ .............................................. H04L 12/28
(52) U.S. Cl. .................. 370/351; 370/392; 370/395.31; 370/428
(58) Field of Search .............................. 370/351, 352, 370/353, 356, 359, 392, 395.2, 397, 399, 412, 413, 417, 419, 428, 429, 395.31, 395.32, 423, 400, 401; 709/238, 245

(56) References Cited

U.S. PATENT DOCUMENTS

| | | | | |
|---|---|---|---|---|
| 5,748,905 A | * | 5/1998 | Hauser et al. .............. | 709/249 |
| 5,790,554 A | * | 8/1998 | Pitcher et al. .............. | 370/471 |
| 6,147,976 A | * | 11/2000 | Shand et al. ................ | 370/254 |
| 6,341,130 B1 | * | 1/2002 | Lakshman et al. .......... | 370/389 |
| 6,449,256 B1 | * | 9/2002 | Varghese et al. ............ | 370/238 |

OTHER PUBLICATIONS

Miei et al, Parallelization of IP–Packet Filter Rules, IEEE, pp. 381–388.*

* cited by examiner

Primary Examiner—Frank Duong
(74) Attorney, Agent, or Firm—Kenyon & Kenyon (57) ABSTRACT

A system and method of packet classification for advanced packet forwarding using a table-based classification method is implemented using a minimum of additional system hardware. The table-based search process implemented for basic packet forwarding is leveraged to accomplish advanced packet classification through the use of a classification table system and classification information stored in data packets. Packet forwarding decisions may be made based on the result of the classification table search.

22 Claims, 6 Drawing Sheets

ROOT
(Table ID = 0) — 300

| Search Key (MAC Address) | Next Table ID | Next Table Key Code | Classification Data | Classification Valid |
|---|---|---|---|---|
| . . . | | | | |
| 0000000123 | 1 | FF000000h | . . . | F |
| 0000000124 | 0 | . . . | 1 | T |
| . . . | | | | |
| 0000000456 | 2 | 00C00000h | . . . | F |
| default | 0 | . . . | 8 | T |

320 points to row 0000000123.

*Figure 3*

SECONDARY TABLE
(Table ID = 1) — 400

| Search Key (Data Type) | Next Table ID | Next Table Code | Classification Data | Classification Valid |
|---|---|---|---|---|
| 0 (none) | 0 | . . . | 1 | T |
| 1 (html) | 0 | . . . | 1 | T |
| 2 (ftp) | 0 | . . . | 1 | T |
| 3 (streaming data) | 0 | . . . | 0 | T |
| . . . | | | | |
| default | 0 | . . . | 1 | T |

412 → 1 (html); 414 → 2 (ftp); 416 → 3 (streaming data)

TABLE-BASED PACKET CLASSIFICATION

BACKGROUND INFORMATION

In information networks, data are often transmitted over the network in groupings called "frames" or "packets." Devices connected to the network may communicate with each other by passing data packets between each other over the network. Transmission is achieved by apportioning the transmitted data into a number of packets, with each packet including "header" information that allows for reconstruction of the data upon receipt by the desired destination device. The header information will include addressing information about the destination device in order for the packet to be forwarded to the desired destination device.

Within the network are forwarding devices (e.g., routers, gateways, switches) that forward packets through the network to the destination device, according to the addressing information contained in the packet header. These forwarding devices use the addressing information stored in the packet as part of the decision process in determining how to forward the packet over the network. This determination has been commonly performed using a forwarding table stored in the forwarding device. The forwarding table provides the appropriate forwarding information based on the destination address specified in the packet (for example, the network address of the next forwarding device likely to be helpful in routing the packet to its final destination).

With the increasing use of packet-switched data networks to carry various types of communications—for example, telephony, real-time video, multicasting, and file-type data (e-mail, file transfers)—selective switching of data packets is becoming important in order to implement different Quality of Service (QoS) levels for each type of communication. For example, video communications requires high bandwidth and timely delivery of data (in order to resolve the video images in real-time and in the proper sequence), while file-type transmissions need not be delivered immediately. These data steams streams may be identified by different protocols used for their transmission. Also, network providers would like to be able to offer differential levels of service in order to accommodate customers that are willing to pay more for enhanced transmission capacity or special network configurations (e.g., virtual private networks).

One way to account for the more advanced forwarding considerations described above is by performing packet "classification"—that is, to determine the nature of the data being transmitted and then determine an appropriate way to handle the data as it traverses the network. Classification requires further analysis of the contents of the packet, and such analysis can be time consuming in the context of a switching process, particularly in light of the numerous different types of data streams in use (and being developed). In order to achieve packet classification in this environment, it has been believed that dedicated hardware or powerful general-purpose processors would be required. Neither of these implementations is ideal: dedicated classification hardware is not easily upgradable for processing new developments; and powerful general-purpose processors (while flexible) incur expenses that may make the device cost-prohibitive.

SUMMARY OF THE INVENTION

According to the present invention, a method of packet classification is implemented. The method includes receiving a data packet including classification information, making a classification determination for the data packet based on the classification information, and forwarding the data packet based on the classification result. Making a classification determination for the data packet based on the classification information includes locating in a classification table system comprising a number of records a first record corresponding to a first portion of the classification information, and forming a classification result from a classification data entry of the first record.

Also according to the present invention, a packet forwarding device is described. The packet forwarding device includes a number of input ports and a number of output ports, as well as a classification table system having a number of records, each record including at least a search key entry and a classification data entry. The packet forwarding device also includes a processor coupled to the number of input ports, the number of output ports and the classification table to forward a data packet including classification information received at one of the number of input ports to at least one selected output port. The at least one selected output port is determined based on a search of the classification table system to locate a first record based on a correlation of the search key entry of the first record and at least a portion of the classification information of the data packet.

DETAILED DESCRIPTION

Figure 1:
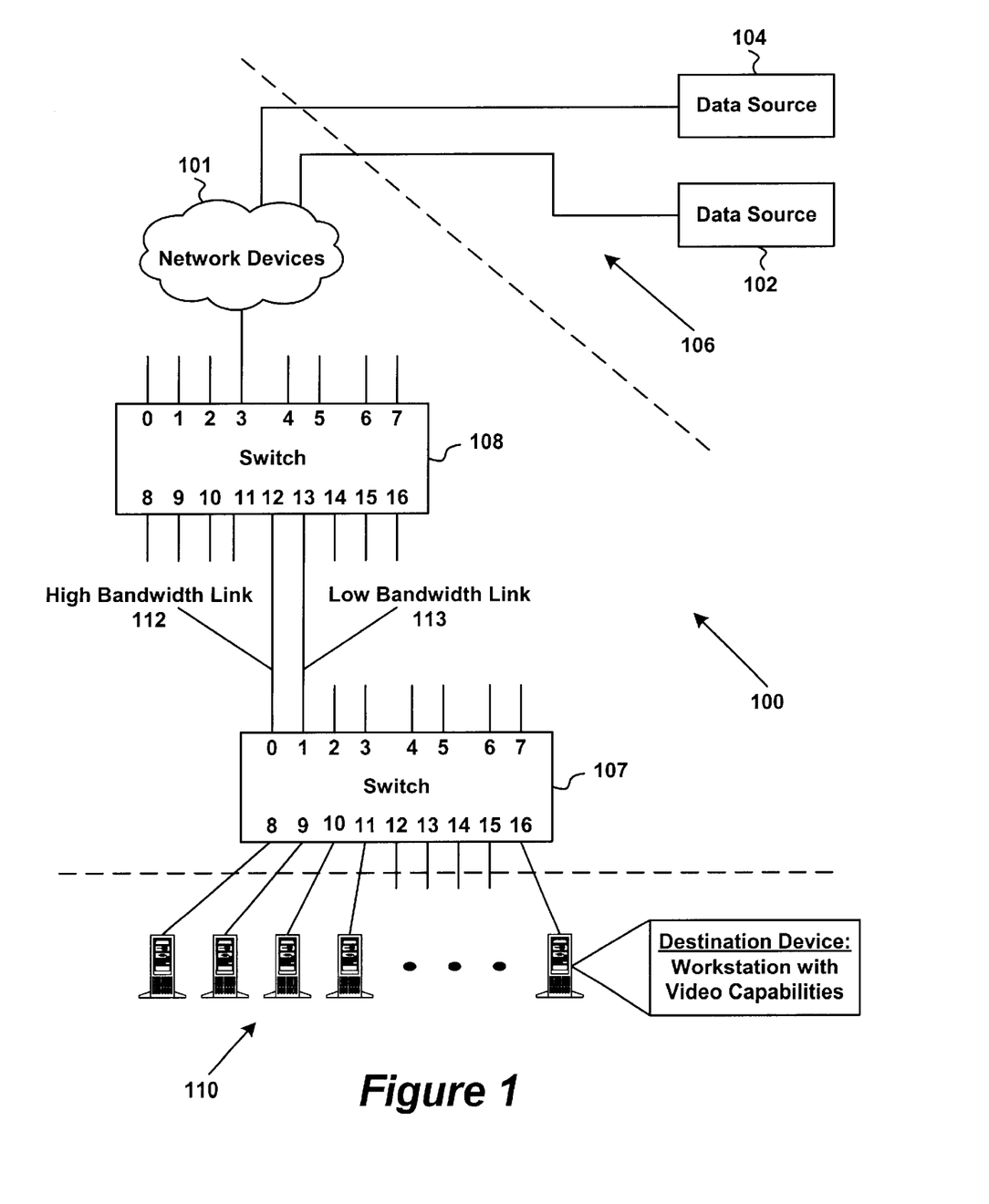
FIG. 1 shows an exemplary network in which a table-based packet classification system may be implemented, according to the present invention.

FIG. 1 illustrates an example of a network that may be used in conjunction with the present invention. Network 100 may encompass any of the known types of data networking (Ethernet, TCP/IP—Transmission Control Protocol/Internet Protocol, Token Ring). Data sources 102, 104 are connected to the network via physical communication links 106. Data sources may comprise single "host" servers, or may comprise separate networks (e.g., LANs—local area networks) of multiple hosts. In either case, data sources 102, 104 can provide various types of data streams, such as real-time video or audio (e.g., video telephony), non-real-time video or audio (e.g., still images), and file data (e.g., e-mail, file transfers). These data streams may be formatted according to any of the known protocols for such transmissions (SMTP—simple mail transfer protocol, HTTP—hypertext transfer protocol, etc.). Data sources 102, 104 include functionality to format these data streams into packets, including the header information required by the protocols used in the network 100 to transmit the packet over the network 100.

Figure 2:
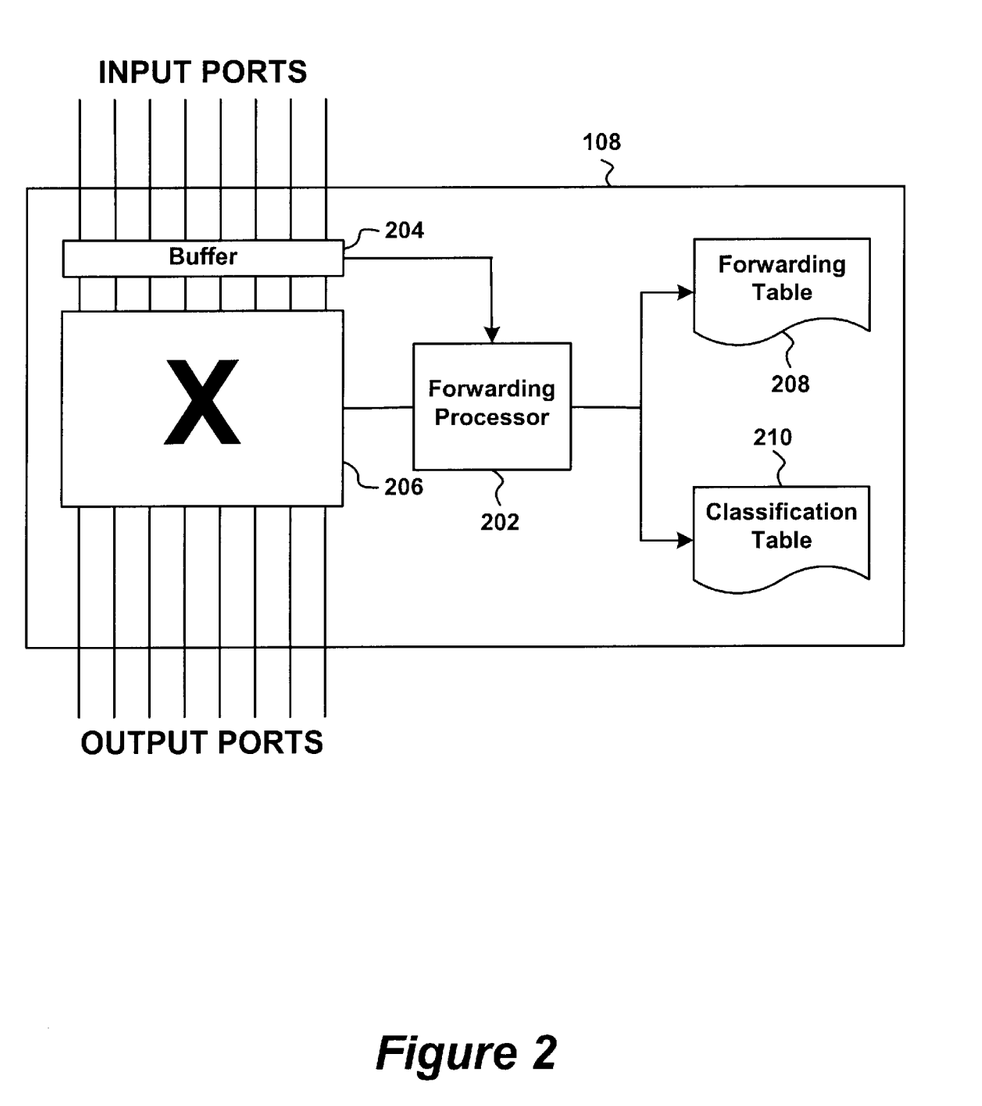
FIG. 2 shows a block diagram of an exemplary forwarding device implementing a table-based packet classification system, according to the present invention.

Also interconnected in the network 100 are network devices 101 and switches 107, 108. Although shown separately in FIG. 1 to more clearly illustrate the present example, switches 107, 108 are representative of other equipment included among network devices 101 (which forms a transmission path to data sources 102, 104). Each of switches 107, 108 include a number of "ports" which may be connected to other network devices or to host devices connected to the network. The number of ports per switch may vary depending on switch implementation; as shown in FIG. 2, switches 107, 108 have eight input ports and eight output ports (8×8), each identified by a number (0–15). Switches having other configurations (e.g., 16×16, 64×64) are well known. As shown in FIG. 1, switch 108 is interconnected with switch 107 via output ports 12 and 13 of switch 108 and input ports 0 and 1 of switch 107. Switch 108 is further interconnected to network devices 101 via input port 3, thus allowing switch 108 to receive packet transmissions from data sources 102, 104.

Connected to output ports 8–15 of switch 107 are a number of host devices 110. Devices 110 may represent various types of devices capable of exchanging information via networking, the most typical example of such devices being computer workstations and personal computers, although other "information appliances" or other networks (e.g., LANs) could also be connected to switch 107. Each device 110 is assigned a destination address that uniquely identifies that device on the network 100. Note that this unique destination address may be implemented in various manners; for example via a "proxy server" arrangement, where a number of host devices are connected to the switch 107 via a server host device (the proxy server).

FIG. 1 further illustrates a potential network configuration for the use of table-based classification according to the present invention. Switch 108 is physically connected to switch 107 in network 100 via two linkages. One of these linkages is a high-bandwidth link 112 (for example, 6 Mbps) which is connected to port 0 of switch 107 and port 12 of switch 108, while the other linkage is a low-bandwidth link 113 (for example, 64 Kbps) which is connected to port 1 of switch 107 and port 13 of switch 108. Owners of switches 107, 108 would like to forward packets between the switches in a manner which takes into account the differing delivery needs of certain packets as well as the possibility of charging higher fees for facilitating high-bandwidth transmissions. By classifying the packets received at switch 108 that are destined for the devices 110 that are connected to switch 107, switch 108 can forward packets using either the high-bandwidth link 112 or the low-bandwidth link 113, as is appropriate for the type of data being carried in the packet and/or the level of service that has been purchased for the transmission.

For example, packets carrying real-time video may be routed over the high-bandwidth link 112, since the high-bandwidth link is less likely to be congested with other transmissions (reducing packet loss) and better able to accommodate high data rates. Packets carrying non-real-time data and/or file data can be routed over the low-bandwidth link 113, since time of delivery is not critical.

Switch 108 may achieve classification and appropriate forwarding of packets using table-based classification according to the present invention. Switch 108 may access one or more "classification tables" that may be stored in switch 108 in a manner similar to that used to store the forwarding table already used in switch 108. These classification tables will include entries ("records") that indicate how to treat packets based on selected classification data stored in the packet header information. By using the table searching hardware that already exists in current switching device designs, packet classification can be achieved without costly hardware additions and at a speed comparable to present packet forwarding functionality.

Figure 3:
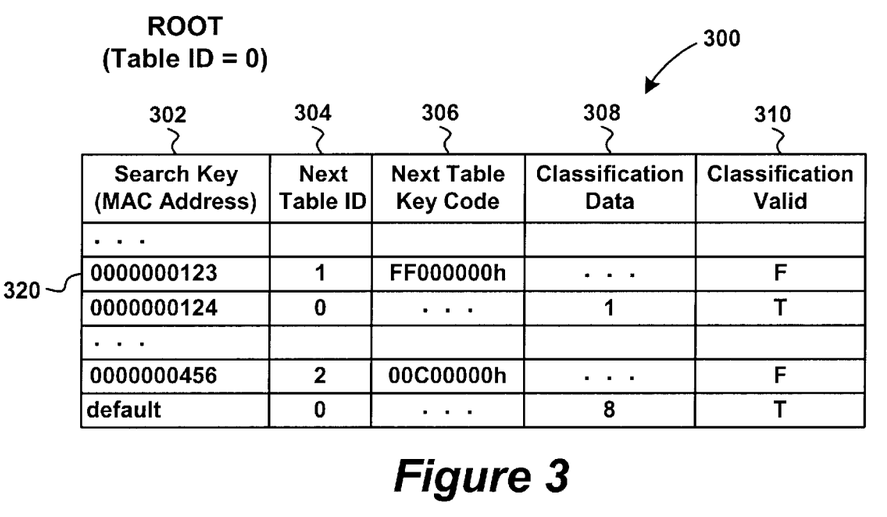
FIG. 3 shows an exemplary root classification table according to the present invention.
Figure 4:
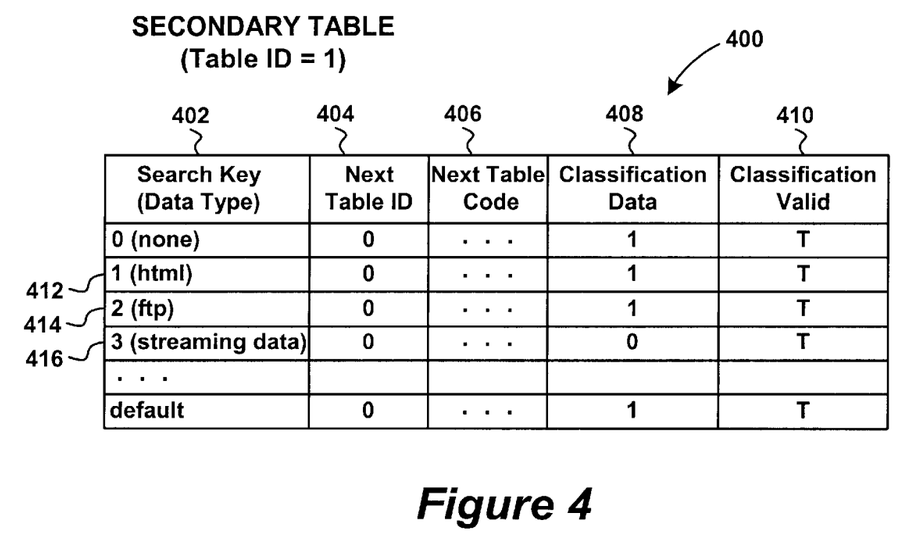
FIG. 4 show an exemplary secondary classification table according to the present invention.

A first example of a table-based classification-implementation in a switching device according to the present invention is illustrated in FIGS. 2–4. FIG. 2 shows a block diagram of switch 108 hardware. As is well known, switch 108 includes circuitry to perform routing of data packets received from the eight input ports to designated one(s) of the eight output ports, including: a forwarding processor 202 that performs the routing determination, a buffer 204 that receives the data packets from the input ports, a switching fabric 206 allowing the forwarding of data packets from any input port to any output port, and a forwarding table 208. Based on destination address information obtained from packets received in the buffer 204, forwarding processor 202 accesses the forwarding table 208 and searches for the entry corresponding to the destination address. When the destination address is found in the forwarding table, a corresponding gateway address is retrieved by the forwarding processor 202, and the output port associated with the gateway address is selected. The packet is then routed to the selected output port via the switching fabric 206. Any of the buffer 204, switching fabric 206 and forwarding table 208 may be implemented as part of a software program executed by forwarding processor 202.

According to the present invention, a classification table structure 210 is also included in switch 108. Classification table structure 210 is accessible by the forwarding processor 202 in a manner similar to that used to access forwarding table 208 (e.g., implemented in the same memory as the forwarding table 208). The classification table structure 210 may be divided into a number of classification tables, each of which may be directed to a different grouping of classification information. The forwarding processor 202 may search the entries of individual classification tables using a "search key" (i.e., the specific classification information in a packet) and retrieve a "decision code" from the table entry corresponding to the search key. The decision code may represent a number of operations by the forwarding processor: the decision code may indicate the output port number to which the packet should be routed, the decision code may indicate another table search key that needs to be searched to determine the ultimate disposition of the packet.

Use of the classification table structure is facilitated by the use of coding in the packet header to provide information about the contents of the packet. In the present example, this classification information includes bit codes for different types of data transmission by various application-layer processes—for example, telephony, real-time video, file transfer, image data, and so forth—and also may include other information in the packet header such as the destination and source addresses for the packet. The actual classification information used may vary based on the actual network implementation.

FIG. 3 shows the contents of an exemplary "Root" classification table 300 in classification table structure 210. The root classification table 300 serves as a starting point for the classification table search. Column 302 represents the search key for this root classification table 300. In the present example, this column 302 is used to specify different destination addresses for packets transmitted over a Ethernet LAN ("MAC" addresses). Other classification information could also be used as the initial search key (e.g., the source address, application protocol).

Columns 304–310 indicate the table entries that correspond to the record identified by the particular search key value. Column 304 represents a "Next Table ID" code, which in this case indicates a "Table ID" for the next classification table to search for packets being delivered to the associated MAC address. A "Next Table ID" code of 0 indicates that no further table searching is required. Column 306 represents a "Next Table KeyCode" entry, which in this case indicates the type of classification information that should be used to search the next table (only valid where Next Table ID<>0). In this example, the KeyCode is a bit mask to be applied to the packet classification information to select only those bits related to the next table search. Column 308 represents a "Classification Data" code, which in this case indicates a particular port of the switch 108 to use for the forwarding of the packet to the associated destination address. Column 310 represents a "Classification Valid" code, which in this case simply indicates whether the "Classification Data" code in column 308 is a valid table entry. Thus, in FIG. 3, the table record for the search key value "000456" includes the entries "Next Table ID"="2", "Next Table KeyCode"="0C000000h", "Classification Data"="-" (no value), and "Classification Valid"="False" (not set).

FIG. 4 shows the contents of an exemplary "secondary" classification table 400 in the classification table structure 210—i.e., a classification table that can be reached from the root classification table 300 (or possibly from other secondary classification tables 400). Each secondary classification table 400 is identified by a non-zero "Table ID." The particular secondary classification table 400 that is to be searched during a classification process is selected based on the "Next Table ID" entry in the previous classification table.

The secondary classification table 400 is similar to the root classification table 300 in the use of table entries for each record: column 402 of the secondary classification table 400 represents a search "key" that is used to search the table, similar to that used in column 302 of root classification table 300; column 404 represents entries for the "Next Table ID" code similar to that used in column 304 of the root classification table 300; column 406 represents entries for the "Next Table KeyCode" field similar to that used in column 306 of the root classification table 300; column 408 represents entries for the "Classification Data" code similar to that used in column 308 of the root classification table 300; and column 410 represents the "Classification Valid" code similar to that used in column 310 of the root classification table 300. However, the actual data stored in secondary classification table 400 varies from the root classification table 300. As shown in FIG. 4, secondary classification table 400 is organized based on classification information from the packet header indicating data for a particular application-layer process. Classification information indicating "HTML" format data is represented in record 412, classification information indicating "FTP" application data is represented in record 414, and classification information indicating "streaming" data (e.g., streaming real-time video) is represented in record 416. If a classification information code is not recognized as an entry in the chart (e.g., a new transmission type that has not yet been supported in the switch), the search failure may result in the selection of a "default" record.

Figure 5:
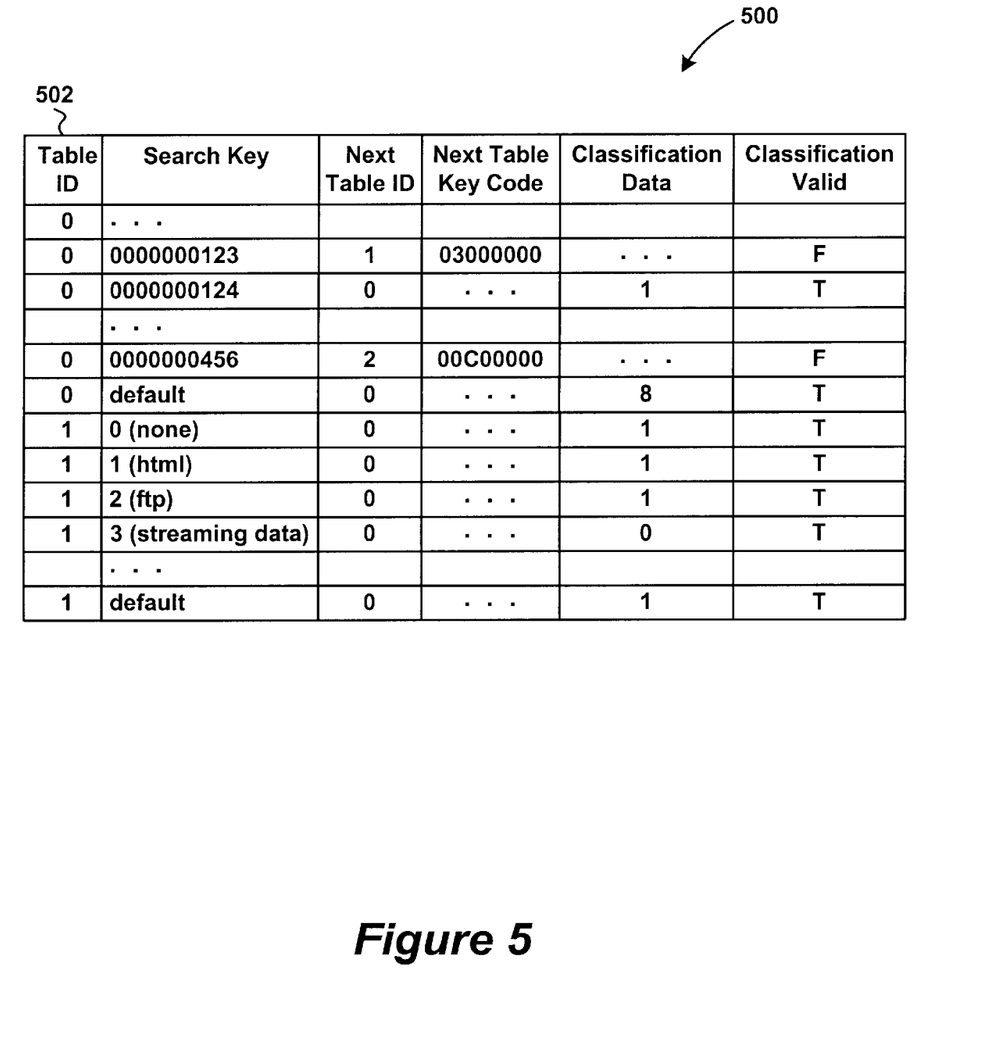
FIG. 5 shows an alternative embodiment of a classification table structure according to the present invention.

Note that other implementations of classification tables are possible. A second example of such tables is shown in FIG. 5. In this second example, the multiple classification tables of the first example are replaced by a single classification table 500. The classification table 500 includes a column 502 that represents a "Table ID" entry similar to the "Table ID" used in the first example of multiple tables, thus providing a way to implement multiple tables in a single memory structure without numerous pointers to multiple tables.

Figure 6:
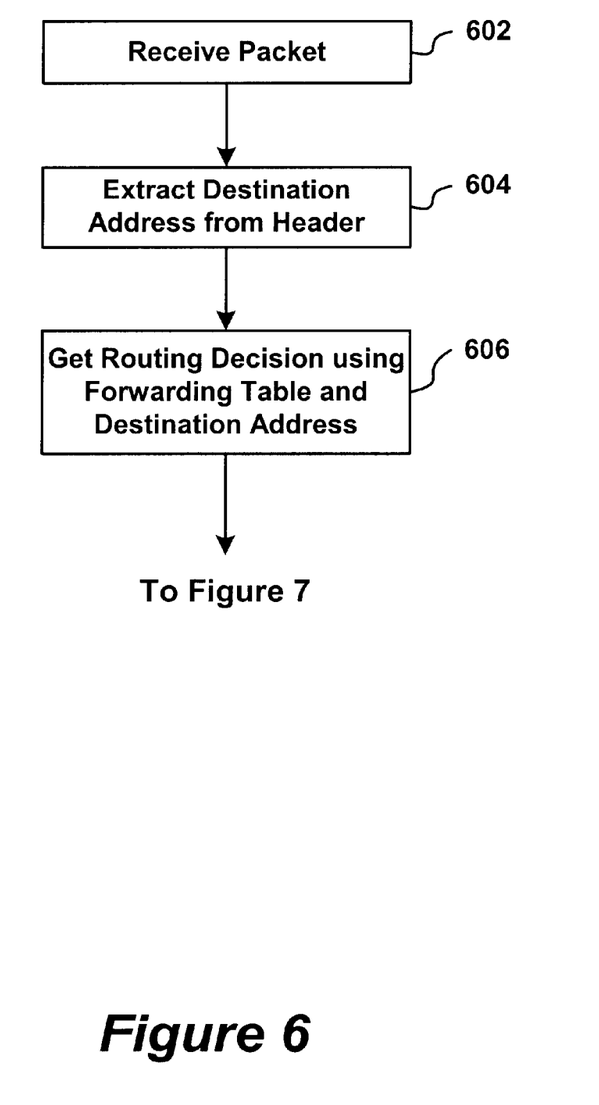
FIG. 6 shows a first flow chart of an exemplary table-based packet classification process, according to the present invention.
Figure 7:
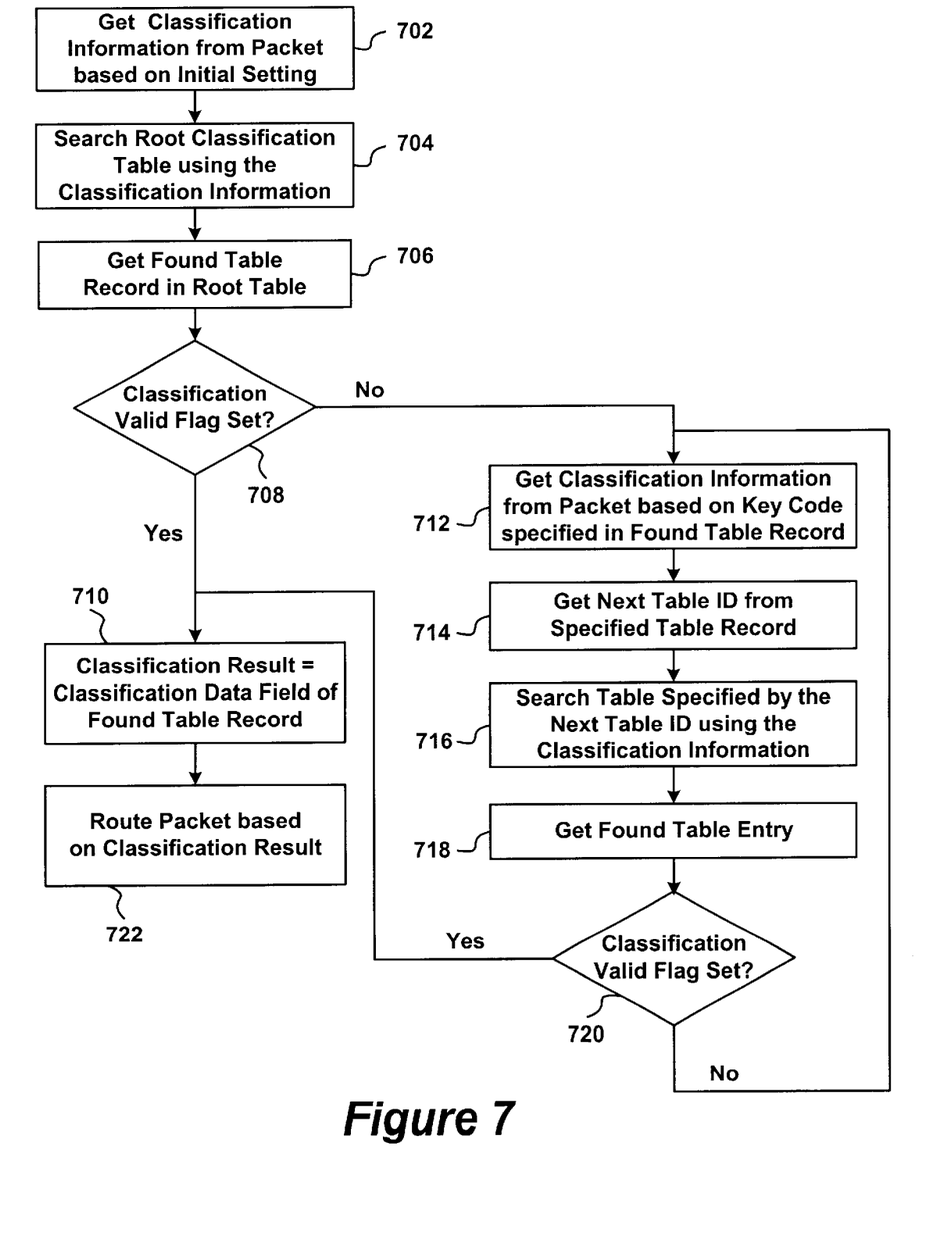
FIG. 7 shows a second flow chart of an exemplary table-based packet classification process, according to the present invention.

An example of a table-based classification and switching method according to the present invention (and using the previously described block diagrams and classification tables of FIGS. 2–4) is illustrated by the flow chart of FIGS. 6 and 7. These flow charts of FIGS. 6 and 7 will be explained in conjunction with an example of the transmission of a packet carrying streaming real-time video data to a device 110 attached to switch 107 (The device 110 has a network address of "0000000123"). The network administrator(s) would like such time-sensitive transmissions to use the high-bandwidth link 112 between switch 108 and switch 107 in order to reduce the probability of data corruption.

As an initial step (step 602), a packet is received in the switching device. In the present example, the packet received has a destination address of "0000000123." The forwarding processor may then extract the destination address from the packet's header information (step 604), and make a general routing decision based on this destination address (step 606). The routing decision may be made by using the forwarding table stored in the switching device, using the destination address as a search key, as is well known. In this case, the general routing decision is to send the packet to output port 13 of switch 108, which is the low-bandwidth link 113 between switch 108 and switch 107.

After making this general routing decision, the switching device may then execute a further classification process based on the packet's classification information (FIG. 7). The switching device will have been programmed to use a particular piece of classification information as an initial search key (in this example, the destination address). The forwarding processor then extracts the desired piece of classification information from the packet's header information (step 702). The forwarding processor searches the root classification table using the piece of classification information extracted from the packet header (step 704). The table record that is found to correspond to the piece of classification information is then locally stored for analysis by the forwarding processor (step 706). In this example, the record 320 for the address "0000000123" is retrieved by the forwarding processor from the root classification table 300.

The forwarding processor checks the "Classification Valid" field of the found table record, to see if the "Classification Data" field represents a final classification result (step 708). If the "Classification Valid" field is set to a "True" value, the contents of the "Classification Data" field are stored as the classification result for the classification process (step 710). If the "Classification Valid" field is set to a "False" value, then further classification table searching is needed. In this example, "Classification Valid" field for the record 320 is set to a "False" value, indicating that further classification table searching is needed.

In the next iteration of the classification process, the value in the "Next Table KeyCode" field of the retrieved record is used to retrieve another piece of classification information from the packet header for use in searching the next classification table (step 712). In this example, the value used to retrieve the next piece of classification information is "FF000000h" (which in this case is a bit mask to a predetermined location in the packet header), which returns a code representing the type of data being carried by the packet (in this case "3"). The value in the "Next Table ID" field of the retrieved record is obtained (in this case "1"), which indicates the secondary classification table that should be searched (step 714). Using the retrieved piece of classification information and the Next Table ID, the forwarding processor performs a search of the classification table structure for a matching search key entry (step 716). Applying the "Next Table Id" of "1" and the search key of "3" results in record 416 (streaming data). The record 416 is retrieved by the forwarding processor (step 718).

The forwarding processor checks the "Classification Valid" field of the retrieved record (step 720). If it is a "False" value, another iteration of the classification process is performed (steps 712–720). If it is a "True" value, the contents of the "Classification Data" field are stored as the classification result for the classification process (step 710). In this case, the "Classification Valid" field of record 416 is set to a "True" value, and therefore the value of the "Classification Data" field—"0"—is stored as the classification result.

In step 722, the classification result is used to perform the routing of the packet to an appropriate output port. In the present example, the "Classification Data" field actually represents an output port to which the packet should be routed, so the classification result may be used by the forwarding processor to directly select the output port for the packet. As a result, the packet is forwarded to output port 12 of switch 108, which is the high-bandwidth link to switch 107—thus achieving the goal of having all packets carrying streaming real-time data payloads to the devices attached to switch 107 to use the high-bandwidth link 112 to prevent transmission delays. Other mapping functions of the classification result to the output ports could also be used, depending on the goals of the classification process. In addition, if one of the options for the packet is that the packet is not transmitted (discarded), one of the classification results would indicate such a result.

As illustrated by the above-described examples, the table-based packet classification method according to the present invention provides a quick and flexible way to perform advanced packet classification in a network forwarding device, without incurring addition equipment expense and maintaining a high degree of flexibility for future development. Note that the examples provided above used a separate classification table structure from the forwarding table in order to maintain backwards compatibility with prior forwarding devices and algorithms. However, where no such backwards compatibility is desired, the classification table may be implemented intermingled with the forwarding table, particularly where the destination address is used as part of the classification process.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A method of packet classification, comprising:
   receiving a data packet including classification information;
   making a classification determination for the data packet based on the classification information, including:
   locating in a classification table system comprising a number of records a first record corresponding to a first portion of the classification information, and
   forming a classification result from a classification data entry of the first record;
   checking the first record to determine if the classification data entry of the first record is valid; and
   forwarding the data packet based on the classification result.

2. The method of claim 1, wherein the step of making a classification determination based on the classification information further includes:
   generating a first search key from the first portion of the classification information of the data packet; and
   using the first search key to perform the location of the first record.

3. The method of claim 1, wherein the classification table system comprises at least one classification table, and wherein each classification table is identified by a table identifier.

4. The method of claim 3, wherein making a classification determination based on the classification information further includes:
   generating a first search key from the first portion of the classification information of the data packet; and
   using the first search key to perform the location of the first record, the first record being stored in a first classification table.

5. The method of claim 4, wherein making a classification determination based on the classification information further includes:
   where the classification data entry of the first record is not valid,
      generating a second search key from a second portion of the classification information of the data packet, based on a search key entry of the first record;
      generating a second table identifier code based on a next table identifier code of the first record;
      locating a second record in a second classification table (identified by the second table identifier code) based on the second search key, and
      forming the classification result from a classification data entry of the second record.

6. The method of claim 1, wherein the classification result is a port number, and the forwarding step includes forwarding the data packet using the port number.

7. The method of claim 1, wherein the classification result is a code indicating that the data packet be dropped, and the forwarding step includes declining to forward the data packet.

8. The method of claim 1, wherein the classification information includes the destination address of the data packet.

9. The method of claim 1, wherein the classification information includes the source address of the data packet.

10. The method of claim 1, wherein the classification information includes a code indicating the type of data carried by the packet.

11. The method of claim 1, wherein the classification information is located in a header of the data packet.

12. A packet forwarding device, comprising
   a number of input ports;
   a number of output ports;
   a classification table system having a number of records, each record including at least a search key entry, a classification data entry, and a classification valid entry; and
   a processor coupled to the number of input ports, the number of output ports and the classification table to forward a data packet including classification information received at one of the number of input ports to at least one selected output port;

wherein the at least one selected output port is determined based on a search of the classification table system to locate a first record based on a correlation of the search key entry of the first record and at least a portion of the classification information of the data packet.

13. The device of claim 12, wherein the classification table system comprises at least one classification table, and wherein each classification table is identified by a table identifier.

14. The device of claim 12, wherein the classification valid entry indicates that the classification data entry is valid.

15. The device of claim 12, wherein the classification table system includes a number of classification tables and each classification table is identified by a table identifier, and wherein each classification table includes a portion of the number of records.

16. The device of claim 12, wherein the at least one selected output port is determined based on the classification data entry of the first record.

17. The device of claim 12, wherein the classification information includes the destination address of the data packet.

18. The device of claim 12, wherein the classification information includes the source address of the data packet.

19. The device of claim 12, wherein the classification information includes a code indicating the type of data carried by the packet.

20. The device of claim 12, wherein the classification information is located in a header of the data packet.

21. A packet forwarding device, comprising a number of input ports;

a number of output ports;

a forwarding table stored in a memory and having a number of records, each record including at least a destination address entry and a forwarding address entry;

a number of classification tables each stored in the memory and each having a number of records, each record including at least a search key entry, a classification data entry, and a classification valid, entry each classification table identified by a table identifier; and a processor coupled to the number of input ports, the number of output ports, the classification table and the forwarding table to forward a data packet including classification information received at one of the number of input ports to at least one selected output port;

wherein the at least one selected output port is determined based on: a search of a first classification table to locate a first record based on a correlation of the search key entry of the first record and at least a portion of the classification information of the data packet, a determination that the classification data entry of the first record is valid, and, if determined valid, a formation of a classification result based on the classification data entry of the first record.

22. A computer-readable medium that stores computer-executable instructions, the computer-executable instructions, when executed, causing a computer to implement a method, the method comprising:

receiving a data packet including classification information;

making a classification determination for the data packet based on the classification information, including:

locating in a classification table system comprising a number of records a first record corresponding to a first portion of the classification information, and forming a classification result from a classification data entry of the first record;

checking the first record to determine if the classification data entry of the first record is valid; and forwarding the data packet based on the classification result.

* * * * *